June 27, 1939. A. STANDLEE 2,163,920
LINKING GAUGE
Filed Jan. 4, 1937 2 Sheets-Sheet 1
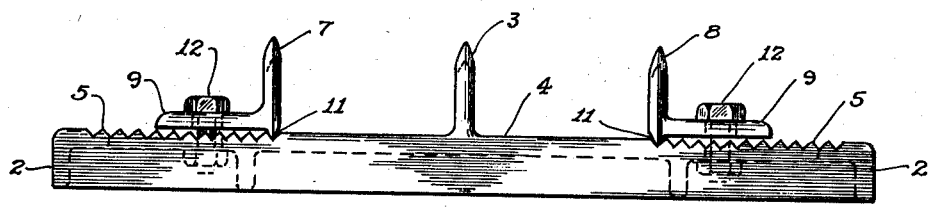
Fig.1
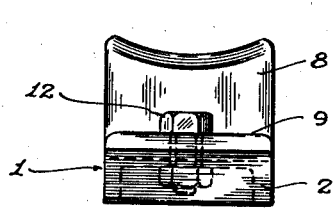 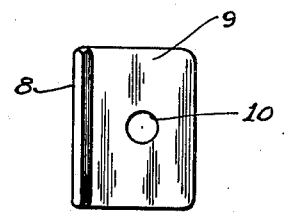
Fig.2 Fig.3
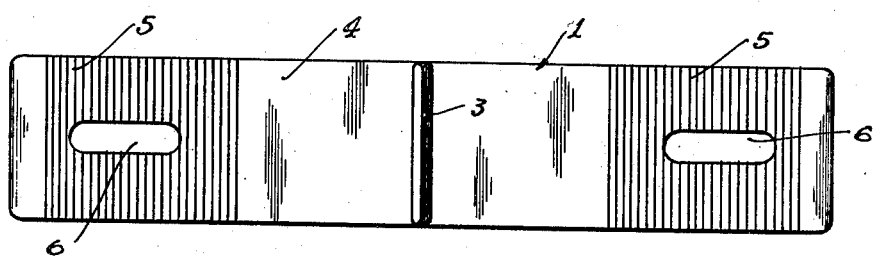
Fig.4
ATTEST
Herbert E. Birch
Wm. C. Meiser
Alonzo Standlee
INVENTOR
BY
ATTORNEY June 27, 1939.  A. STANDLEE  2,163,920
LINKING GAUGE
Filed Jan. 4, 1937     2 Sheets-Sheet 2
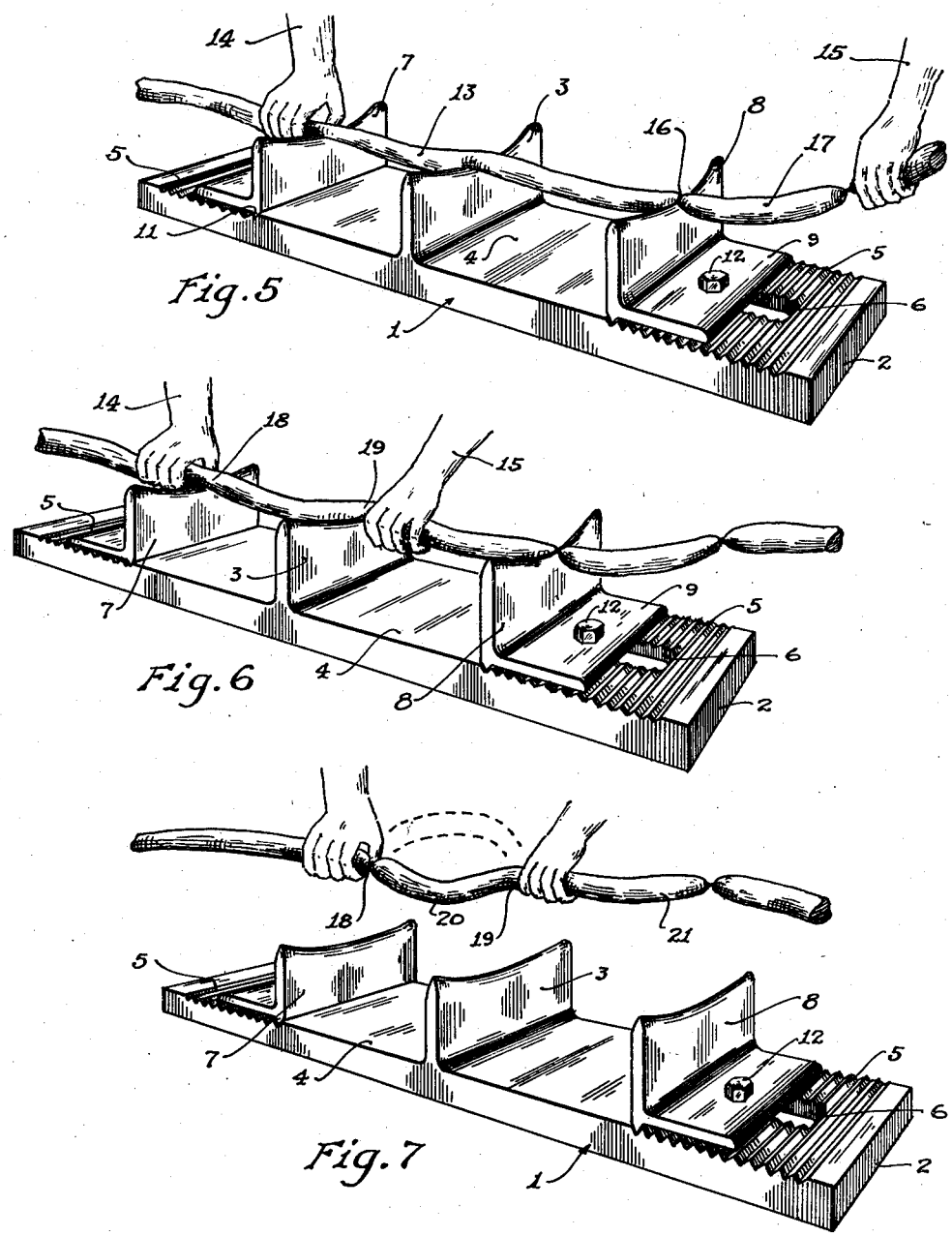
Alonzo Standlee
INVENTOR
ATTEST.
BY 
ATTORNEY Patented June 27, 1939

2,163,920

UNITED STATES PATENT OFFICE 2,163,920

LINKING GAUGE

Alonzo Standlee, Handley, Tex., assignor to Industrial Patents Corporation, Chicago, Ill., a corporation of Delaware Application January 4, 1937, Serial No. 119,039

3 Claims. (Cl. 33—143)

This invention relates to an improved sausage linking gauge.

One of the objects of the invention is to provide an improved sausage linking gauge.

Another object of the invention is to provide an improved linking gauge having adjustable gauge members.

Other objects of the invention will be apparent from the description and claims which follow.

In conventional practice, a link of stuffed sausage casing is measured by an operator relative to a pair of fixed gauge members, the operator after each movement twisting the measured portion of the casing to form an individual sausage link.

The linking device of the present invention provides three suitably aligned gauge members and enables the operator at each movement of the stuffed casing to measure and twist two individual lengths.

In the use of the device of the present invention, one end of a stuffed casing is drawn across a first and second gauge member and into registry with a third gauge member. The operator then by a single movement of both hands pinches the stuffed casing relative to the first and second gauge members and in one continuous movement continues to twist the casing at the constricted points thus forming two additional links in the casing. The casing is again drawn across the gauge members until the last twist is brought into registry with the third gauge member and the operation repeated.

In the drawings like characters are used to designate similar elements.

Figure 1 is a side view of a linking gauge constructed in accordance with the present invention.

Figure 2 is an end view of Figure 1.

Figure 3 is a top view of one of the adjustable gauge plates.

Figure 4 is a top view of the central gauge member and the plate.

Figures 5, 6 and 7 are perspective views of the device shown in Figure 1, illustrating the several manipulative steps of the method of the present invention.

The linking gauge, illustrated in the drawings, comprises an elongated base plate 1, of cast metal or other suitable material, mounted upon risers or uprights 2. A central gauge member 3 is arranged to extend transversely of base 1 and, if desired, may be formed integral with the upper surface 4 of base 1. Surface 4, at each of its ends, is provided with a series of transverse notches 5 and longitudinal slot 6 for spacedly securing the gauge members 7 and 8 relative to gauge member 3. The corresponding notches 5, at each of the ends of surface 4, preferably bear a definite relationship relative to gauge member 3 so that gauge members 7 and 8 may be quickly adjusted an equal distance relative to gauge member 3 without the use of other measuring means.

Gauge members 7 and 8 are each provided with a bearing plate 9 having an opening 10 and a transversely extending tooth 11 adapted for engagement with notches 5. In practice, gauge members 7 and 8 are spacedly adjusted relative to gauge member 3 and are rigidly secured by bolt member 12 passing through opening 10 and slot 6. It will be seen that stuffed sausage casings may be measured into links of any desired length by the adjustment of gauge members 7 and 8 relative to gauge member 3.

The outer transverse edges of each of the gauge members 3, 7 and 8 are aligned substantially in a horizontal plane, are tapered to a relatively fine measuring edge, insufficient, however, to cut the casing, and are conveniently concaved to prevent the stuffed sausage casing from rolling off the sides thereof.

In use, the stuffed casing 13, as shown in Figure 5, while held loosely in the hand 14 of an operator, is drawn by hand 15 of the operator across gauge members 7 and 8 until the outer twist 16 of the last link 17 is brought into registry with gauge member 8. As shown in Figure 6, the operator next pinches the casing relative to the measuring edges of gauge members 7 and 3, as as 18 and 19, and in one continuous movement, as shown in Figure 7, raises the casing away from the gauge members and with a twirling motion of the hands twists the casing at the constricted points 18 and 19 thus forming new links 20 and 21. The casing is then again drawn relative to the gauge members, as shown in Figure 5, until the twist 18 is brought into registry with gauge member 8 and the operation repeated. It will be seen that by each movement of the stuffed casing relative to the several gauge members, the operator forms two additional links of uniform length.

I claim:

1. A sausage linking gauge comprising a base having a centrally fixed, transversely extending gauge member and a series of transversely extending notches at either end thereof, a gauge member movably mounted relative to the notches and to the fixed gauge member, each of the movable gauge members being provided with a bearing plate having a tooth adapted for engagement with notches at its respective end and means for fixedly securing the movable gauge members in spaced relation with the fixed gauge member, each of the gauge members being concaved at their measuring edges for supporting a stuffed sausage casing therebetween.

2. A sausage linking gauge comprising a pair of spaced gauge members and means for securing each of the gauge members in fixed position, each of the gauge members being provided with an elongated gauge edge curved upwardly toward its ends and being adapted for withholding one end of a sausage link between the ends thereof.

3. A sausage linking gauge comprising a base, a gauge member fixedly mounted on said base, a pair of gauge members movably mounted on said base for adjustment relative to one another and to the fixed gauge member and means for fixedly securing each of the movable gauge members to said base, each of the gauge members having an elongated gauge edge concaved in a vertical plane and being adapted for withholding one end of a sausage link between the ends thereof.

ALONZO STANDLEE.